United States Patent [19]
Loper, Jr. et al.

[11] Patent Number: 4,951,508
[45] Date of Patent: Aug. 28, 1990

[54] VIBRATORY ROTATION SENSOR

[75] Inventors: Edward J. Loper, Jr.; David D. Lynch, both of Santa Barbara, Calif.

[73] Assignee: General Motors Corporation, Detroit, Mich.

[21] Appl. No.: 366,223

[22] Filed: Jun. 12, 1989

Related U.S. Application Data

[63] Continuation of Ser. No. 788,281, Oct. 17, 1985, abandoned, which is a continuation-in-part of Ser. No. 546,826, Oct. 31, 1983, abandoned.

[30] Foreign Application Priority Data

Oct. 25, 1984 [EP] European Pat. Off. ........ 84307330.5

[51] Int. Cl.$^5$ ..................... G01C 19/42; G01C 19/56
[52] U.S. Cl. ..................... 73/505; 73/1 D; 73/1 DV; 73/504
[58] Field of Search .............. 73/1 DV, 505, 517 AV, 73/517 A, 517 R, 1 D, 1 E, 510, 504

[56] References Cited

U.S. PATENT DOCUMENTS

| | | | |
|---|---|---|---|
| 3,625,067 | 12/1971 | Emslie | 73/505 |
| 3,656,354 | 4/1972 | Lynch | 73/505 |
| 3,678,762 | 7/1972 | Denis | 73/505 |
| 3,719,074 | 3/1973 | Lynch | 73/505 |
| 4,149,260 | 4/1979 | Loper, Jr. | 364/817 |
| 4,157,041 | 6/1979 | Loper, Jr. et al. | 73/505 |
| 4,222,272 | 9/1980 | Mairson | 73/510 X |
| 4,470,124 | 9/1984 | Tagumi et al. | 73/1 D X |
| 4,520,669 | 6/1985 | Rider | 73/517 R X |
| 4,522,062 | 6/1985 | Peters | 73/505 |
| 4,601,206 | 7/1986 | Watson | 73/510 X |
| 4,654,663 | 3/1987 | Alsenz et al. | 73/505 X |

OTHER PUBLICATIONS

"The HRG: A New Low-Noise Inertial Rotation Sensor" presented at *Proceedings, 16th Joint Srvices Data Exchange for Inertial Systems* in Los Angeles, Cal:6., on 16-18 Nov. 1982, paper pp. 1-6 by Edward J. Loper et al. and 4 cover or contents pages.

"Part X: Hemisherical Resonator Gyro"; *IEE Transactions on Aerospace and Electronic Systems;* vol. AES-20, No. 4; Jul. 1984, pp. 432-433; by David D. Lynch.

*Primary Examiner*—Tom Noland
*Attorney, Agent, or Firm*—Albert F. Duke

[57] ABSTRACT

A vibratory rotation sensor includes a hemispherical resonator, a ring forcer electrode and a plurality of discrete forcer and pick-off electrodes. A vibratory or flexural standing wave pattern is established in the resonator and signals from the pick-off electrodes are combined to produce first ($E_c$) and second ($E_s$) signals that represent two independent components of the vibration pattern. A reference phase generator generates timing signal that are used to demodulate $E_c$ and $E_s$ to obtain in-phase and quadrature components thereof. The quadrature components are transformed in a computer to generate nodal and antinodal quadrature signals. The nodal quadrature signal is used as the error signal in a quadrature control loop that keeps both components of the vibration pattern in phase. The antinodal quadrature signal is used as the error signal in a phase-locked loop that keeps the phase of the reference phase generator locked to the phase of the vibration.

11 Claims, 12 Drawing Sheets

*HEMISPHERICAL RESONATOR GYRO ELECTRONICS LOOPS*

HEMISPHERICAL RESONATOR GYRO ELECTRONICS LOOPS

PATTERN ANGLE READOUT

RESONATOR AMPLITUDE CONTROL

START CIRCUIT

QUADRATURE DETECTOR

LOGIC CONTROL; PHASE LOCKED LOOP

RESONATOR QUADRATURE CONTROL

VIBRATORY ROTATION SENSOR

This is a continuation of application Ser. No. 788,281 filed on Oct. 17, 1985, and now abandoned. Ser. No. 788,281 was itself a continuation-in-part of U.S. patent application Ser. No. 546,826 filed Oct. 31, 1983, and now abandoned.

BACKGROUND OF THE INVENTION

This invention relates to vibratory rotation sensors, and more particularly to a sensor of the "vibrating bell" type referred to as a sonic gyro.

Sonic gyros are disclosed in U.S. Pat. Nos. 3,625,067; 3,656,354; 3,678,762; 3,719,074 and 4,157,041. This type of gyro is also disclosed in "The HRG: A new low-noise interial rotation sensor". PROC. 16th JT. SERVICES DATA EXCHANGE FOR INERTIAL SYSTEMS, Los Angeles, Calif., Nov. 16–18, 1982 by E. J. Loper and D. D. Lynch and in IEEE Transactions on Aerospace and Electronics Systems Vol. AES-20 No. 4, July, 1984.

The gyro consists of three principal fused quartz parts, a forcer, a hemispherical resonator and a pick-off, joined together with indium and enclosed in a vacuum metal housing.

SUMMARY OF THE INVENTION

It is an object of the present invention to provide a vibratory rotation sensor of the aforementioned type having improved drift performance.

BRIEF DESCRIPTION OF THE DRAWINGS

A more complete understanding of the present invention may be had from the following detailed description which should be read in conjunction with the drawings in which.

DETAILED DESCRIPTION OF THE PREFERRED EMBODIMENT

Figure 1:
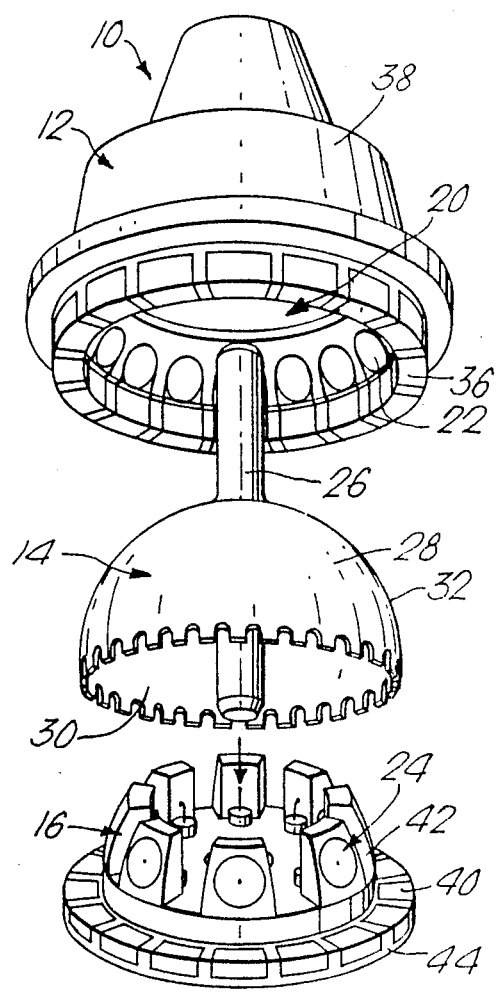
FIG. 1 is an exploded view of the principal components of a vibratory rotation sensor in accordance with the invention.
Figure 5:
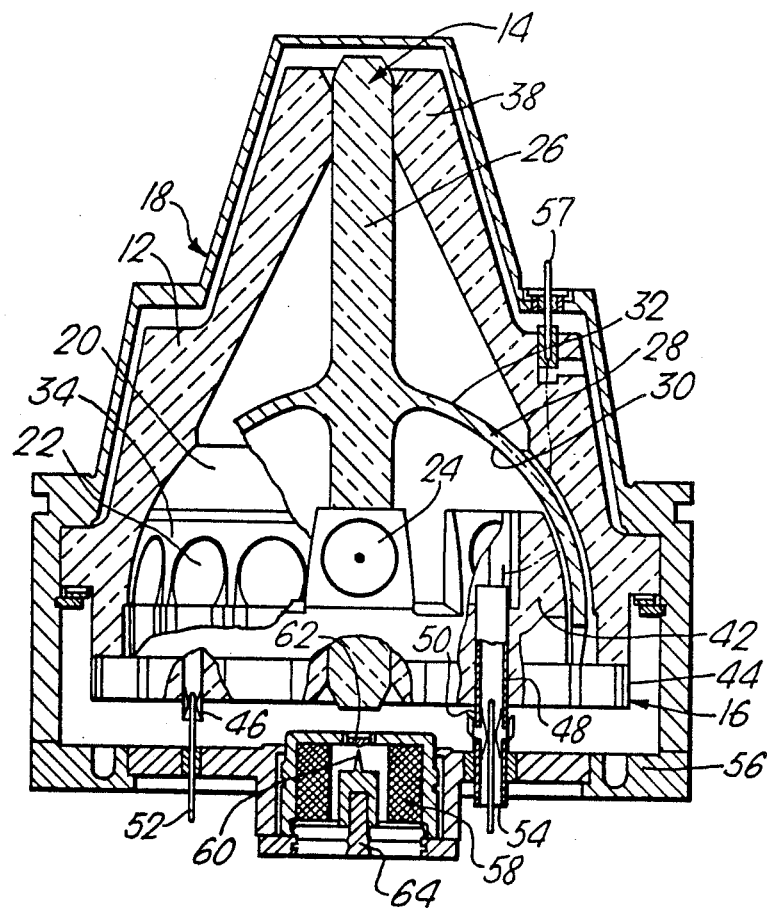
FIG. 5 is a cross-sectional view of the sensor in FIG. 1.

Referring to FIGS. 1 and 5, the gyro 10 comprises a forcer 12, a hemispherical resonator 14 and a pick-off 16, all of fused quartz, joined together with indium and enclosed in a vacuum metal housing 18.

The forcer 12 contains a ring forcer electrode 20, used to sustain vibration of the resonator 14 at constant amplitude, and sixteen discrete forcer electrodes 22, used to suppress quadrature vibration of the resonator. The pick-off 16 contains eight pick-off electrodes 24 used to sense the azimuth orientation of the vibration pattern of resonator 14.

The resonator 14 is formed with a stem 26 that passes through the hemisphere 28 and is mounted at each end. The resonator stem 26 serves two purposes. It provides a means for supporting the resonator 14 with minimal damping of its vibratory motion, and it provides separate electrical connections to the inner and outer hemispherical surfaces 30 and 32 respectively. The length of the stem 26 is chosen so that the mounting surfaces are more than three stem diameters removed from the transition area between the stem and the hemisphere.

The forcer electrodes 22 address the outer surface 32 of the hemisphere 28, and the shape of the discrete electrodes 22 is circular A conductive area 34 surrounds the discrete electrodes 22 and separates them from the ring forcer electrode 20. This conductive surface 34 continues to the outside metallized area of the forcer where it is connected to ground, and is referred to as the "ground plane". Its purpose is to reduce the interelectrode capacitive coupling. The circular form of the discrete electrodes 22 also reduces the interelectrode coupling and provides a shape that can more easily be located and formed with adequate precision.

The pick-off electrodes 24 address the inner surface 30 of the resonator 14 and are a circular shape. As is the case with the discrete forcer electrodes 22, the circular shape allows them to be formed using a rotary tool which is a less expensive and more accurate process than with other shapes.

The conductive area of each discrete forcer electrode 22 extends to the rim 36 of the forcer housing 38 (the surface at which pick-off and forcer housings are joined) and thence across the rim 40 of the pick-off housing 42 to its outside flat surface 44. Circuitry is plated on this flat surface 44 to provide the desired interconnections between discrete electrodes 22 and to carry the leads to their metal socket terminals 46. The electrical connection to the inner surface 30 of the resonator is also made using a conductor plated on the outside flat surface of the pick-off housing 42 extending from the resonator stem to a metal socket (not shown). The electrical connection to each pick-off electrode 24 is carried through a hole in its center by a wire that attaches to the inside of a quartz tube 48. The tube 48 passes through the pick-off housing 42 to its flat outer surface and provides a coaxial conductor for the pick-off signal (inside surface of the tube) and its guard (outside surface of the tube). This tube 48 terminates in a metal coaxial socket 50.

The flat outer surface 44 of the pick-off housing 42 carries two circuit arrays, one having eight coaxial sockets 50, and the other, eight single-conductor sockets 46. Connections from these sockets are carried through the metal vacuum housing 18 by eight metal pin feedthroughs 52, and eight coaxial feedthroughs 54 built into the pick-off cover 56 of the vacuum case.

In addition to the sixteen electrical feedthroughs 52,54 of the pick-off cover 56, there are two single-pin feedthroughs 57 in the main vacuum case 18 to bring out the connection from the ring forcer electrode and the one from the resonator outside surface. The latter feedthrough is not shown.

A gas getter 58 is used to maintain a high vacuum inside the gyro case in order to reduce aerodynamic damping of the resonator 14 to an acceptable level. The getter 58, a commercially available device of sintered zirconium, is preactivated and sealed inside a titanium capsule. The capsule is designed so that it can be opened to the inside volume of the vacuum housing 18 after final sealing of the gyro 10. This feature provides the opportunity to observe the rate at which internal gas pressure builds up following sealing of the gyro 10 so that the quality of the hermetic seal can be determined. The internal gas pressure can be estimated from a measurement of the damping time of the resonator 14, and the rate at which pressure builds up can then be used to predict the useful life of the gyro 10. (After the getter 58 is opened to the internal volume of the gyro, the gas pressure immediately drops to a low value, so that no further information about seal quality can be obtained until the getter's capacity starts to be exceeded). The getter penetrator is shown in FIG. 5. It consists of a hardened steel point 60 located near a thin membrane section 62 of the capsule inner wall. The penetrator 60 can be made to puncture the membrane 62 by applying pressure to the penetrator mounting 64 from outside the getter 58.

Figure 2A:
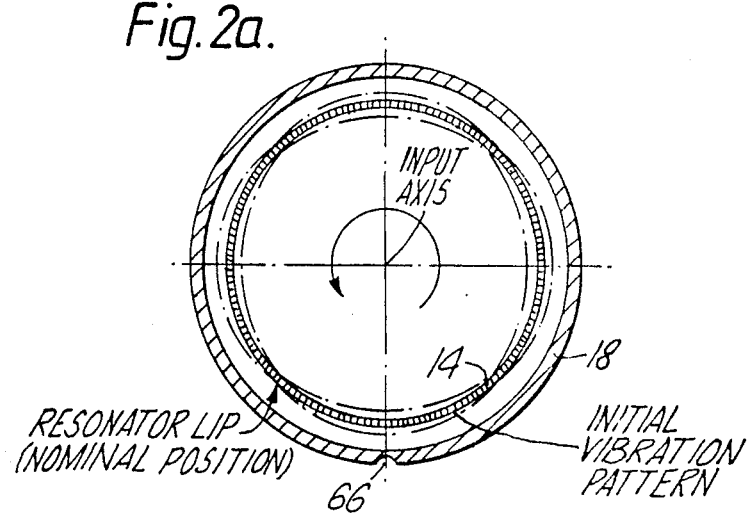
FIGS. 2a and 2b illustrate the precession of the vibration pattern antinodes in response to rotation of the hemispherical resonator.

FIG. 2 illustrates how the vibration or flexural standing wave pattern responds to inertial rotation of the resonator 14 about its polar axis. Assume that the vibration pattern antinodes are initially aligned with the case reference notch 66, as shown in FIG. 2a. During a ninety-degree counter-clockwise rotation of the resonator 14, the antinodes will precess relative to the case by approximately 27 degrees in the clockwise direction. The relative precession rate, or angular gain, is very nearly three-tenths, and is a geometric constant of the resonator 14.

Figure 2B:
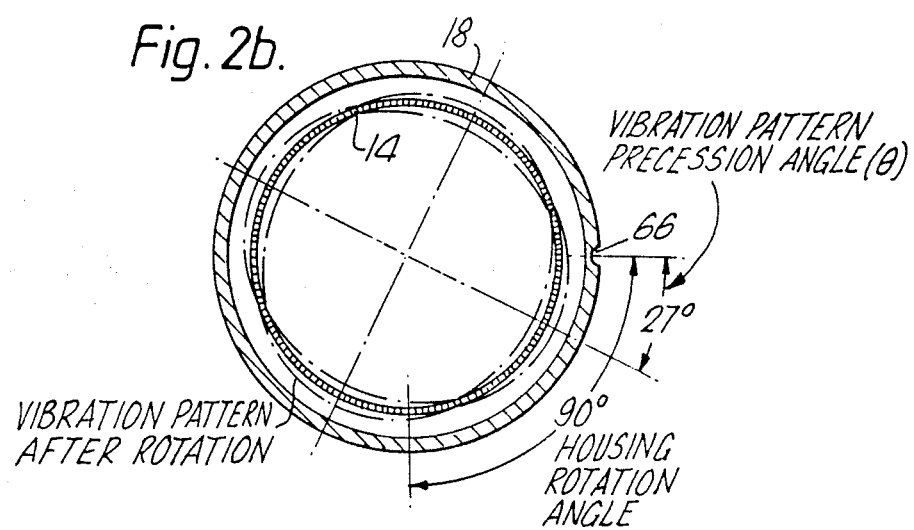

Precession of the vibration pattern in response to an input inertial rate can be described in an alternate, but equivalent, manner. The inertial rotation can be thought of as causing the amplitude of the vibration pattern in FIG. 2-a to decrease and a new component pattern to build up whose antinodes lie 45 degrees from the original pattern antinodes; that is, whose antinodes coincide with the nodes of the original pattern. The superposition of these two pattern components produces the resultant pattern. In FIG. 2b, for example, the superposition of the two pattern components produces a resultant whose antinodes lie 27 degrees from the original pattern antinodes.

NORMAL MODES-QUADRATURE VIBRATION

Figure 7:
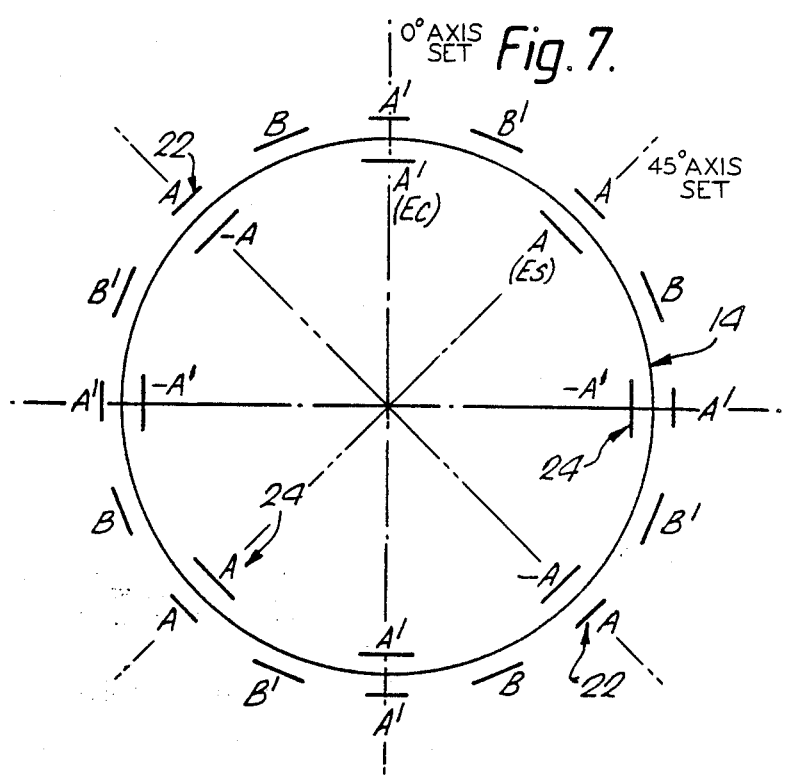
FIG. 7 is a pictorial representation of the electrode structure.
Figure 8:
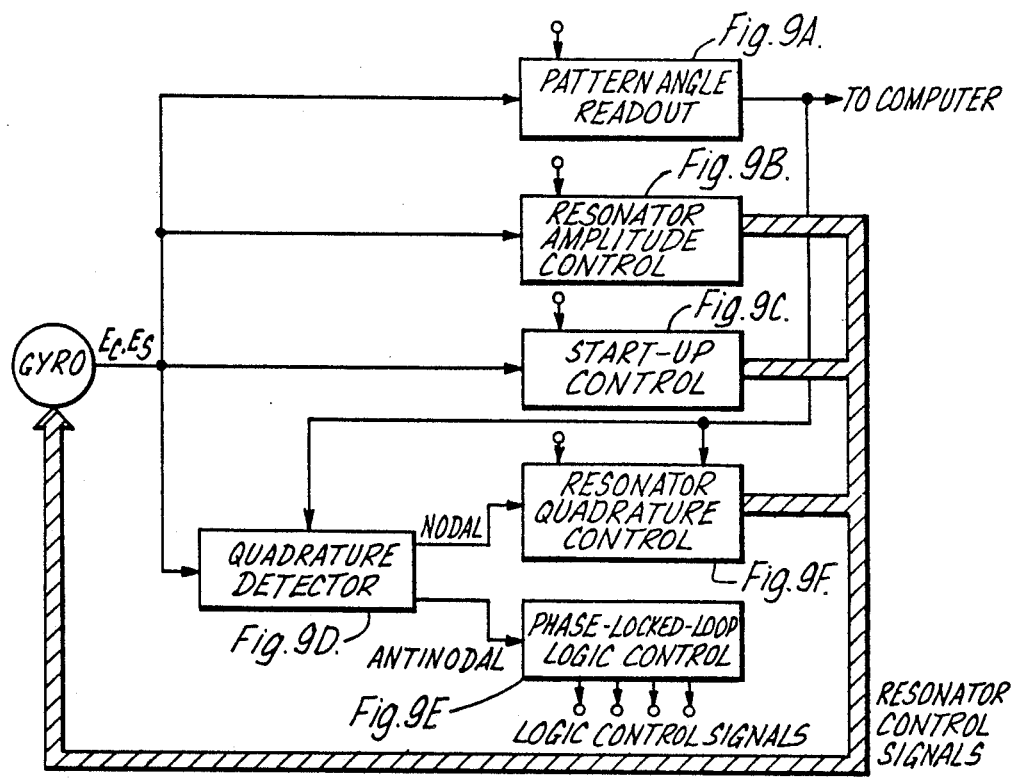
FIG. 8 is an overall block diagram of the signal processing and control circuitry of the present invention.

The vibration pattern may be considered to be made up of components along an arbitrarily chosen pair of axes. The most convenient axes for describing vibration components are the pick-off electrode axes (FIG. 7). There is a unique set of axes, however, that have the property that the components of the vibration pattern along them are uncoupled in the absence of rotation (and in the absence of certain perturbations that will be considered later). These are the so-called normal modes axes. Their location is determined by the resonator mass/stiffness variation in the circumferential direction. The normal mode axis locations can be visualized for the particularly simple mass distribution shown in FIG. 3. A vibration pattern with antinodes along the axes through the added masses (the solid axes) will oscillate at a lower natural frequency than a pattern with antinodes along the dashed axes. The lower natural frequency is hereinafter referred to as $\omega_2$ and the higher natural frequency as $\omega_1$. Also, the normal mode axis set with the lower natural frequency $\omega_2$ is displaced from a 0-degree electrode(hereinafter defined) by an angle $\Theta w$.

If a vibration pattern is established with antinodes not along either of the normal mode axis sets, each of its normal mode components will oscillate at its respective natural frequency. If the normal mode components were initially in phase, their phases would gradually separate at a rate equal to the difference of the natural frequencies. The transfer of energy between the normal mode components caused by rotation is responsible for the precession of the vibration pattern. This transfer is highly phase sensitive because rotation causes each normal mode to be forced at the frequency (and phase) of the other. The normal mode components of the vibration must therefore be kept in phase in order to insure a constant gyro scale factor. Preventing phase separation between these normal mode components is one of the essential gyro control functions.

When the phase separation between the normal mode components is small, the resulting vibration pattern is nearly identical with the pattern shown in FIG. 2. The main difference is that, where the nodes should be, there is a small amplitude vibration in phase-quadrature to the main vibration. The amplitude of this quadrature vibration is proportional to the phase difference of the normal mode components. Means of suppressing this nodal quadrature vibration are discussed below.

The purpose of the HRG electronics is to drive and control the resonator vibration and to monitor the location of the pattern. The four major functions of the electronics are: (1) reference phase generation, (2) amplitude control, (3) quadrature suppression, and (4) pattern angle readout. Each of these functions are discussed below.

PICK-OFF ELECTRODE FUNCTION

The eight pick-off electrodes 24 are shown in FIG. 1. They address the resonator 14 across a small gap so that each electrode 24, together with the portion of the resonator addressed, constitutes a portion of a spherical capacitor. A dc reference voltage is maintained on the inner surface 30 of the resonator 14 so that the capacitance variations that occur as the resonator vibrates result in electrical signals proportional to the time-varying resonator displacements with respect to the pick-off electrodes. These eight pick-off signals are combined electrically to generate two signals ($E_c, E_s$) proportional to two independent components of vibration. If one of the pick-off electrodes is arbitrarily labeled the 0-degree electrode, one of the combined signals is obtained by summing the signals from the 0-degree and 180-degree electrodes and subtracting the sum of the signals from the 90-degree and 270-degree electrodes. The combined signal ($E_c$) obtained in this way discriminates against rigid body motions of the resonator with respect to the electrodes. A similar combination of the remaining four electrode signals yields a combined signal ($E_s$) representing the other independent vibration component.

REFERENCE PHASE GENERATOR

Figure 9A:
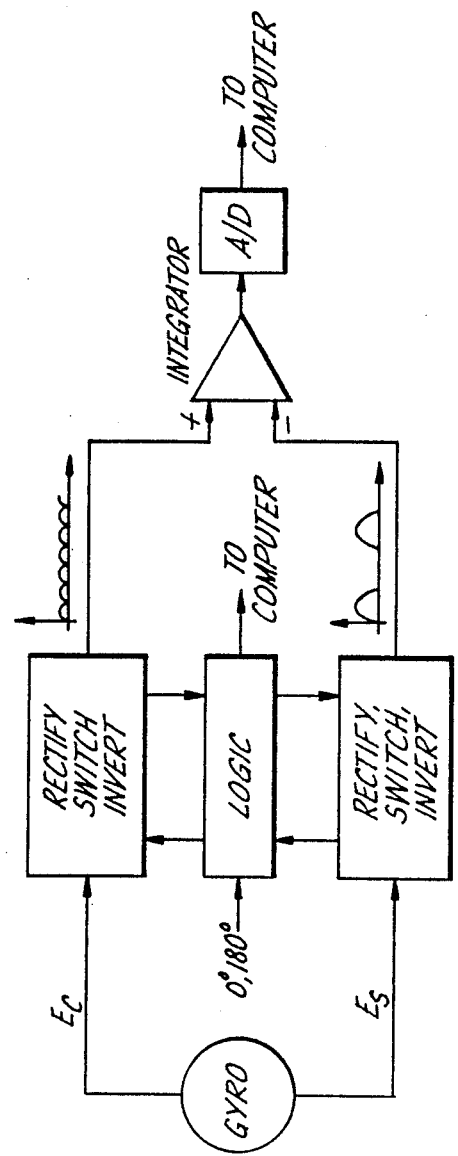
FIGS. 9A to 9F are more detailed block diagrams of the circuitry in FIG. 8.
Figure 9B:
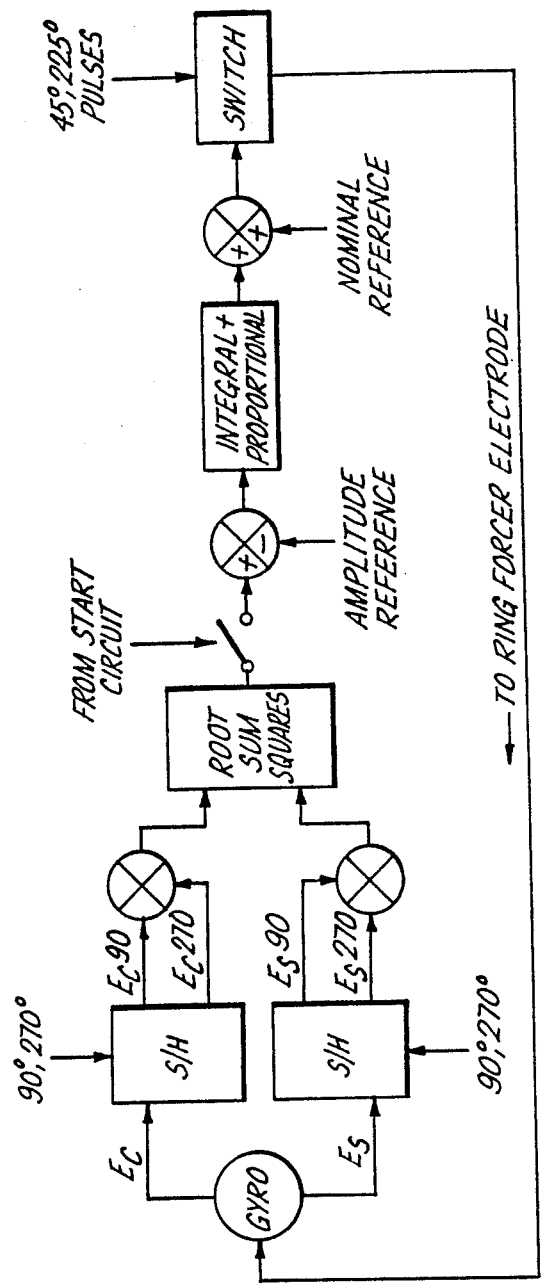
Figure 9C:
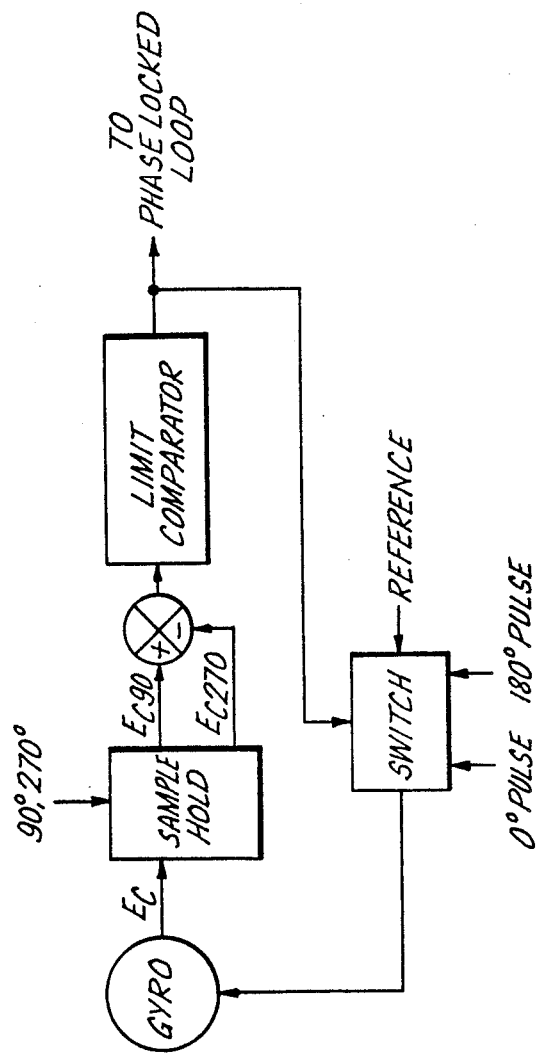
Figure 9D:
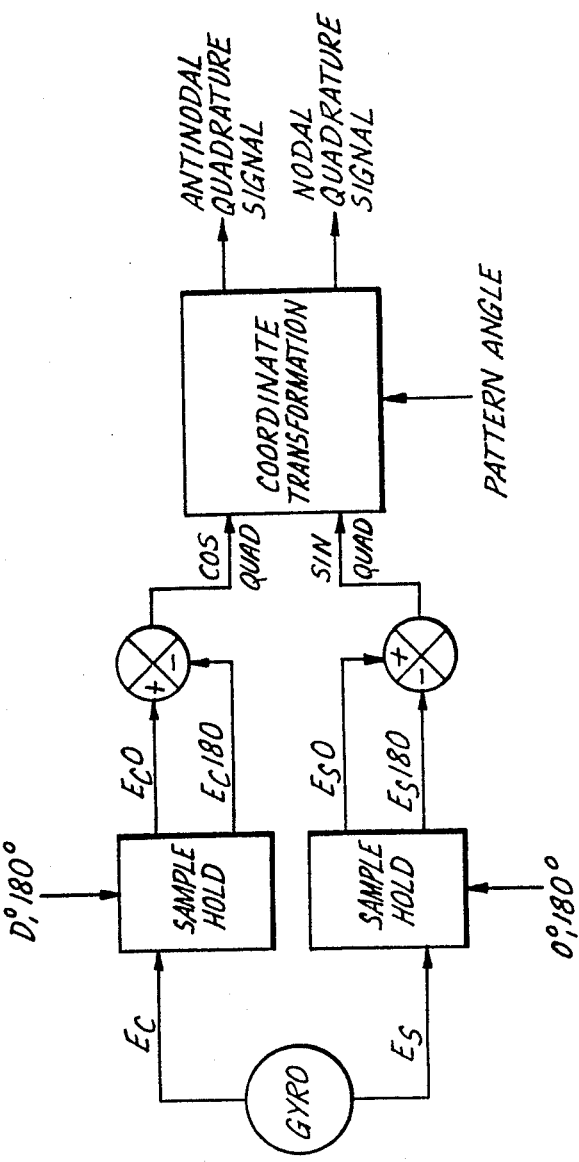
Figure 9E:
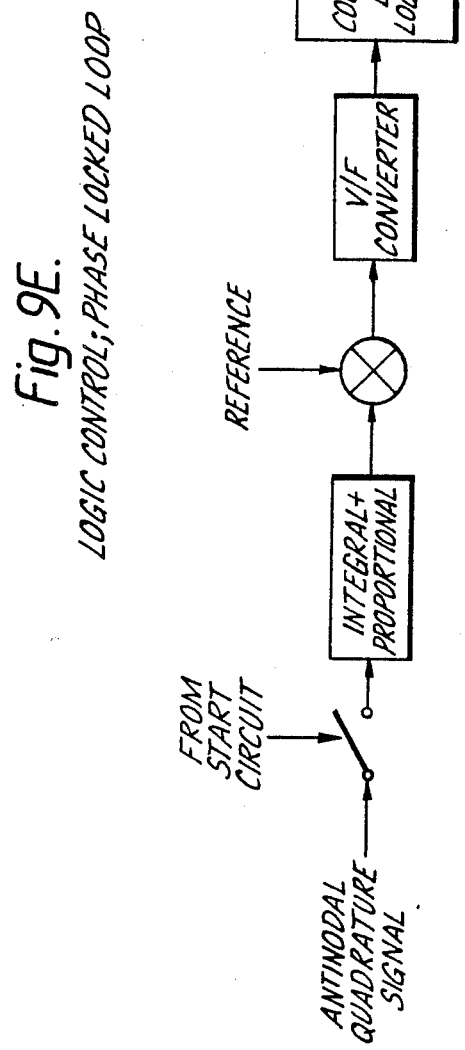

A reference phase generator (see FIG. 9E) produces timing signals as shown. $E_c$ and $E_s$ are demodulated with respect to the timing signals of the reference phase generator. The components of $E_c$ and $E_s$ that are in phase with the reference signal are used to derive an error signal for use in the amplitude control loop (FIG. 9B). Also the integral of $E_c$ and $E_s$ are used to identify the readout angle $\Theta$ i.e. the angle between the pattern antinodes and the 0-degree electrode axis sets (FIG. 9A).

The quadrature components of $E_c$ and $E_s$ are transformed in a computer to generate a nodal quadrature signal and an antinodal quadrature signal. For example, the quadrature component of $E_c$, (COS QUAD), is multiplied by the cosine of twice the readout angle, (COS 2Θ), and is added to the quadrature component of $E_s$, (SIN QUAD), multiplied by the sine of twice the readout angle, (SIN 2Θ), to produce the antinodal quadrature signal. Similarly the nodal quadrature signal is produced by multiplying the COS QUAD by Sin 2Θ and subtracting the product of SIN QUAD and COS 2Θ. The aforementioned expressions may be written as:

(1) ANTINODAL QUAD=(COS QUAD)COS 2Θ+(SIN QUAD)SIN 2Θ
(2) NODAL QUAD=(COS QUAD)SIN 2Θ−(SIN QUAD)COS 2Θ

Figure 9F:
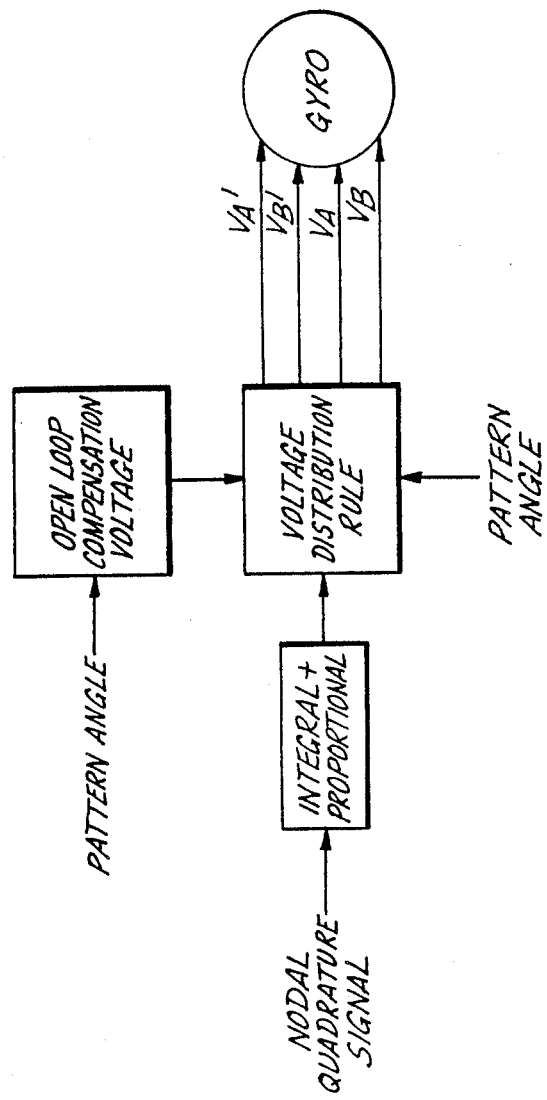

The nodal quadrature signal is used as the error signal in the quadrature control loop (FIG. 9f) that keeps both components of the vibration pattern in phase. Thus, (3) Quadrature Control Loop Error Signal=

$$\epsilon_{QUAD} \epsilon_{QUAD} = C1(\text{NODAL QUAD}) + C2 \int (\text{NODAL QUAD}) dt$$

where C1 and C2 are proportionality constants The antinodal quadrature signal is used as the error signal for the phase-locked loop (FIG. 9e) that keeps the phase of the reference phase generator locked to the phase of the vibration.

The resonator oscillation frequency has a temperature sensitivity of about 80 parts per million per degree Centigrade due to the temperature coefficient of Young's modulus of fused quartz. Since the reference phase generator is locked to the resonator, its frequency provides a direct measure of the temperature of the resonator and is used for thermal modeling.

AMPLITUDE CONTROL

Figure 4:
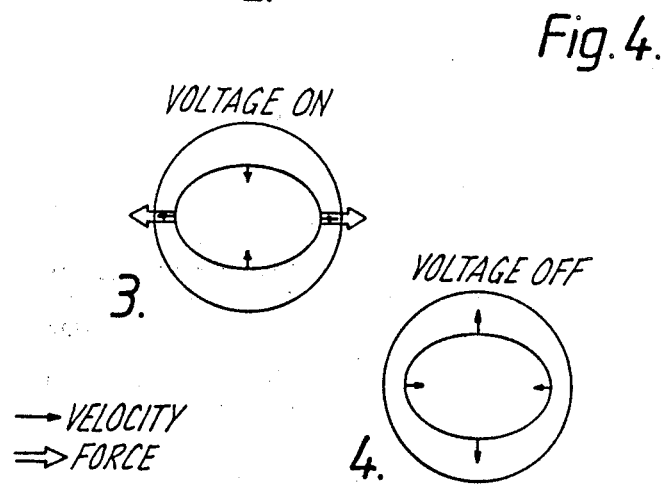
FIG. 4 illustrates the ring forcer operation of the sensor in FIG. 1.

The vibration is sustained at constant amplitude through the application of a square wave voltage to the ring electrode 20. The square wave timing is controlled by the reference phase generator. The voltage is on during the first and third quarters of the resonator's oscillation cycle, and off during the second and fourth as shown in FIG. 4. Thus, a force is exerted on the resonator 14 during the time the amplitude is increasing, and no force is exerted on the resonator during the time the amplitude is decreasing. The net force per unit area exerted on the resonator is inversely proportional to the square of the local gap. Therefore, as the resonator's flexing motion carries it from its neutral (circular) shape to its fully flexed (elliptical) shape, the attractive force increases in the smaller gap regions by more than it decreases in the larger gap regions. The net force the ring electrode 20 exerts on the resonator 14 thus lies along the antinodal direction of the vibration pattern; hence, energy is supplied to make up for damping without causing the pattern to drift toward a particular location.

The error signal for the amplitude control loop is the difference between a reference voltage and a voltage proportional to the sum of the squares of the in-phase components of $E_c$ and $E_s$.

QUADRATURE CONTROL

Figure 3:
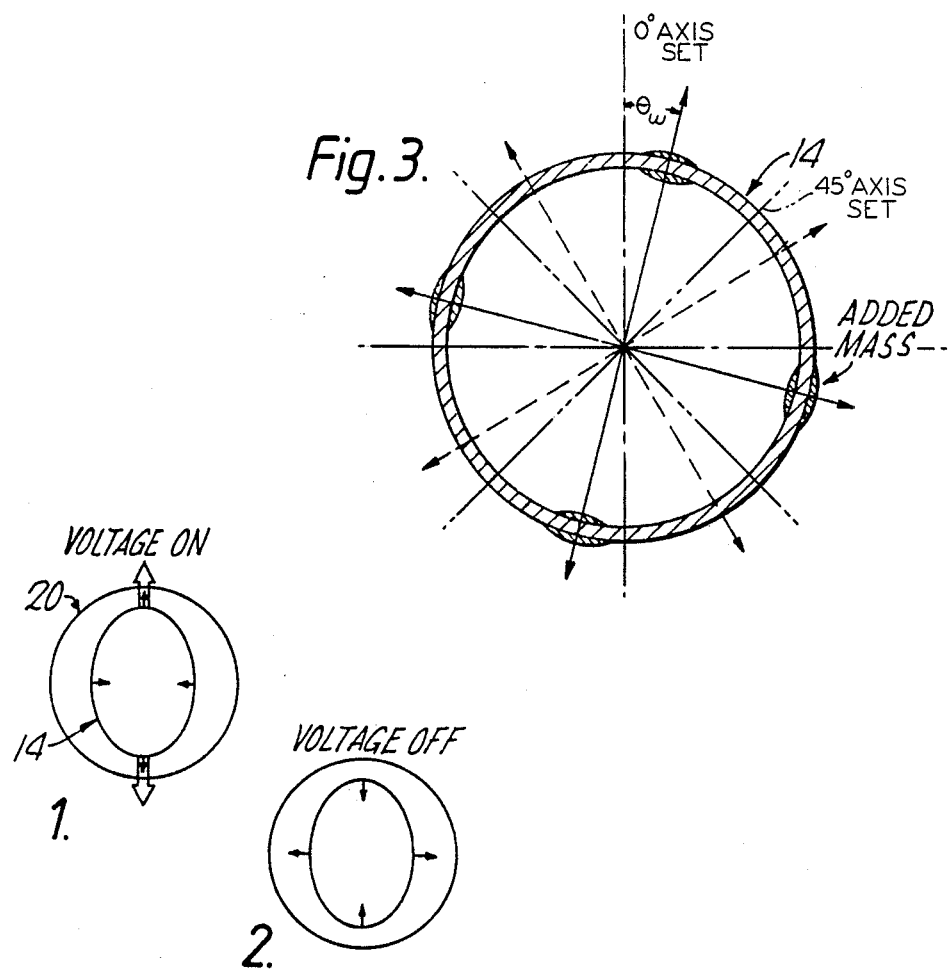
FIG. 3 illustrates the location of the normal mode axes as determined by the resonator mass/stiffness variation in the circumferential direction.

Two normal modes having slightly different frequencies ($\omega_1, \omega_2$) result from slight variations in resonator characteristics having four-fold symmetry in the circumferential direction, as, for example, the mass variations in FIG. 3. The strategy of quadrature control adopted for the HRG is to introduce electrical spring forces to shift the normal mode axes to coincide with the vibration pattern.

Voltages are placed on discrete forcer electrodes in groups of four. In FIG. 7, for example, arbitrarily calling one of the electrodes the -degree electrode, a common voltage $V_A$, (which may be zero is placed on the 0-degree, 90-degree, 80-degree, and 270-degree electrodes (A' electrodes). Placing common voltages on such a set of four electrodes contributes to the definition of the normal modes, not because the forces act like added mass as in FIG. 3, but because they act like added "springs"; like added negative springs, in fact. Just as in the case of the ring forcer, the force per unit area on the resonator in the vicinity of an electrode at a different electrical potential is attractive, with a magnitude proportional to the square of the voltage and inversely proportional to the square of the local gap. With four symmetrically located electrodes at a common potential, the force per unit area on an undeformed resonator is radially outward and there is no net force tending to excite the deformation corresponding to the n=2 vibration mode. When the resonator deforms, however, there is a net force tending to make it deform still further. That is, the force that the four electrodes exert on the vibrating resonator is a negative spring force, or negative stiffness.

The quadrature control loop (FIG. 9f) functions as follows. As described in the Reference Phase Generator paragraphs above, the quadrature parts of the combined pick-off electrode signals are transformed in the computer to generate a signal proportional to a linear combination of the amplitude of the quadrature vibration component at the nodes of the main pattern and its integral as indicated in equation (3). This nodal quadrature error signal is amplified with high gain and distributed on the discrete forcer electrodes 22 in accordance with the following equations (4) and (5). As indicated in equations (4) and (5), the nodal quadrature error signal (the third term on the right hand side of each equation) is respectively added to or subtracted from the first two terms which relate to the Open Loop-Quadrature Vibration Drift Compensation which will be discussed later. In the discussion immediately below, the first two terms will be assumed to be zero.

$$V_{A'} \text{ or } V_A = S\left[\left|\Delta\omega\cos4\theta_\omega + \frac{C_o}{1-\nu}\left(\frac{W_{pk}}{h}\right)^2 \omega\cos4\theta + G\epsilon_{quad}\sin4\theta\right|\right]^{\frac{1}{2}} \quad (4)$$

$$V_{B'} \text{ or } V_B = S\left[\left|\Delta\omega\sin4\theta_\omega + \frac{C_o}{1-\nu}\left(\frac{W_{pk}}{h}\right)^2 \omega\sin4\theta - G\epsilon_{quad}\cos4\theta\right|\right]^{\frac{1}{2}} \quad (5)$$

where
$\omega_1, \omega_2$ = normal mode frequencies;
$\Theta_\omega$ = azimuth of $\omega_2$
$\Delta\omega = \omega_1 - \omega_2$
$\omega = \dfrac{\omega_1 + \omega_2}{2}$
$w_{pk}$ = peak resonator deflection at lip
$h$ = resonator wall thickness γ=Poisson's ratio
Co=dimensionless constant~0.1
S=voltage conversion factor
G=Quadrature control loop gain The voltages are applied on either the A' or A set of electrodes and on either the B' or B set of electrodes. The sets chosen are determined by the equations (4) and (5). In the equation dealing with the A and A' electode set, if the term inside the brackets is positive the voltage is placed on the A electrode set. If the term is negative the voltage is placed on the A' electrode set. Similiarly, for the B and B' electrode set, if the term is positive the voltage is placed on the B set and if negative on the B' set. Distribution of the voltage this way produces a negative electrical spring along an axis set 22.5 degrees from the pattern antinodes. When the steady state is reached (in a short time because of the high gain), this electrical spring causes the normal mode axes, including the spring contributions, to coincide with the vibration pattern nodes and antinodes, and the nodal quadrature vibration is driven to zero.

The effectiveness in suppressing growth of quadrature vibration of a negative electrical spring along an axis set 22.5 degrees from the pattern antinodes may be understood from a slightly different point of view. It was explained earlier that, when the phase difference between the normal mode components of the vibration is small, the pattern is like that of FIG. 2, with the main difference being that where the nodes should be there is a small amplitude vibration in phase-quadrature to the main vibration. An equivalent description, valid when the phase difference between the normal mode components is small, is that the vibration is composed of two components. One of the components has antinodes along an axis set 22.5 degrees to the right of the antinodes of the main pattern while the other component has antinodes 22.5 degrees to the left of the main pattern. The two components are equal in amplitude (0.707 times the amplitude of the main pattern) and have a phase difference proportional to the phase difference of the normal mode components and, therefore, proportional to the nodal quadrature signal. To prevent growth of nodal quadrature vibration, then, it suffices to cause the two 22.5-degree pattern components to oscillate at the same frequency and in phase with each other. The negative electrical spring is therefore applied along the 22.5-degree axis set corresponding to the component oscillating at the higher frequency. The quadrature control loop (FIG. 9F) adjusts the magnitude of the negative spring to reduce the frequency of the one component to equal that of the other and to drive the phase difference to zero.

READOUT

Generation of the pick-off electrode signals was described above under Pick-Off Electrode Function. The signal processing involved in computing the location of the vibration pattern antinodes is shown in FIG. 9A. The angle Θ in FIG. 2b is to be determined. It is the angle from the 0-degree pick-off electrode axes to the vibration pattern antinodal axes. (Θ is 27 degrees in FIG. 2b.) $E_c$ and $E_s$ are sinusoids varying at the vibration frequency, with amplitudes proportional to the vibration components along the 0-degree and 45-degree pick-off electrode axes, respectively and are therefore proportional to the cos 2Θ and sin 2Θ respectively.

The object of the processing is to determine the ratio of the amplitudes in order to identify Θ. The $E_c$ and $E_s$ signals are first rectified to produce rectified sine wave pulse trains. These pulse trains are fed differentially into the integrator in the following manner. The pulse train of lesser amplitude is continuously fed into the integrator. The pulse train of greater amplitude is switched in such a way as to introduce only enough of the larger pulses into the integrator to keep it nearly balanced. At the end of a given sampling cycle, the ratio of the number of large pulses to the number of small pulses is a rough measure of the ratio of the signal amplitudes. The unbalance of the integrator at the end of the sampling cycle provides the additional information required for an accurate computation.

DRIFT MECHANISMS

Asymmetric Damping

The damping of the vibration pattern arises from such mechanical sources as internal damping within the fused quartz resonator material, residual surface stresses remaining after resonator finishing operations, and damping arising at the bond region between the resonator and its metal coating. The resonator damping is only approximately uniform. Its variation in the circumferential direction gives rise to two distinct damping time constants. As in the case of mass variation, it is the fourth harmonic of the damping distribution that determines the location of the "normal" axes of damping and difference of their time constants. (Compare FIG. 3 where the added lumps may be thought of as regions of added damping.) These normal axes of damping do not generally coincide with the resonator's normal mass/stiffness mode axes and, in any case, the quadrature control loop (FIG. 9F) continually adjusts the voltage on the discrete forcer electrodes so that the normal mode axes, including the electrical springs, coincide at each instant with the antinodal axes of the vibration pattern.

Figure 6:
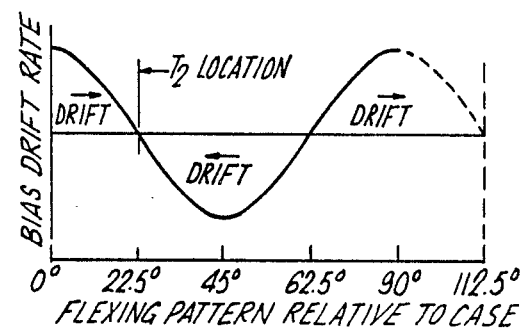
FIG. 6 illustrates the case oriented drift due to asymmetric damping of the sensor in FIG. 1.

Asymmetric damping is one of the principal sources of drift in the HRG. In general, the vibration pattern antinodal axes do not coincide with either normal damping axis set, and the vibration pattern must be considered in terms of its components along the two normal damping axis sets. The amplitudes of these components decay at different rates. If T1 and T2 are the normal time constants, 1/T1 and 1/T2 are the normal component decay rates. The energy lost to damping is replenished by the ring forcer electrode as described above. The rate of energy replenishment is independent of the location of the vibration pattern antinodes. If T1 is the smaller time constant, because the T1 component is losing energy at a greater rate than the T2 component, the energy ultimately all ends up in the T2 component, which is the resonator's "preferred" (least damping) vibration pattern. The result is that the vibration pattern drifts toward its preferred location at a rate proportional to 1/T1-1/T2 and proportional to the sine of four times the difference angle between the existing pattern and its preferred location. The resulting housing-oriented drift is shown in FIG. 6.

RESIDUAL QUADRATURE-VIBRATION DRIFT

In the discussion of the quadrature control loop, it was assumed that the loop succeeded in reducing the quadrature vibration at the nodes of the main pattern to zero. In practice, a small residual quadrature vibration remains. This quadrature residual is the other principal drift source of the HRG.

The quadrature control loop suppresses quadrature by directing dc voltages to selected discrete forcer electrodes 22 to control the direction of the normal mode axes. It causes the normal mode axes to be aligned with the existing vibration pattern, but does not cause the normal mode frequencies to be equal. As a result, the vibration pattern and the reference phase generator oscillate at the one normal mode frequency while the residual nodal quadrature vibration oscillates at the other.

Quadrature is, however, defined in terms of demodulation with respect to the reference phase generator. Since the residual nodal quadrature is at a different frequency than the reference phase generator, it is interpreted as having a growing in-phase component, assuming that initially its phase was in quadrature with the reference phase generator signal. This growing in-phase component at the nodal location is, in effect, a rotation of the vibration pattern. The resultant drift rate is proportional to the product of the residual quadrature amplitude, the difference of the "natural" normal mode frequencies (that is, not including the electrical contributions), and the cosine of four times the angle between the existing vibration and the "natural" normal mode location.

RESIDUAL QUADRATURE-VIBRATION DRIFT; NONLINEAR CONTRIBUTION

The elastic spring force that restores the deformed resonator to its relaxed spherical shape is inherently nonlinear. The normal mode analysis described thus far is an analysis of linearized equations and applies to situations in which the vibration amplitudes are so small that nonlinear terms may be neglected. Under the conditions of operation of the HRG, the nonlinear terms are small, but not negligible. Their effect in perturbing the linear solutions must be taken into account.

To a first approximation, the nonlinearity makes the residual nodal quadrature vibration appear to have a higher natural frequency than the natural frequency of the main pattern. This effect is over and above any of the effects (four-fold symmetric mass variations and electric fields) discussed thus far. It gives rise to a drift by the same mechanism discussed in the last subsection. The major difference is that, since the effective spring for the nodal quadrature vibration appears always to be at the pattern node, the resultant drift magnitude is independent of pattern location; that is, it is a fixed bias drift. Its magnitude is proportional to the residual nodal quadrature vibration amplitude and to the square of the peak amplitude ($w_{pk}$) of the main pattern.

OPEN LOOP QUADRATURE-VIBRATION DRIFT COMPENSATION

In the closed loop quadrature vibration control, dc voltages are placed on selected discrete forcer electrodes 22 so as to develop an electrical spring component along the axis set 22.5 degrees from the pattern antinodal axis set. This electrical spring component is adjusted by the loop so as to cause the normal mode axes to be aligned with the vibration pattern. The drift sensitivity to residual quadrature vibration arises because the resulting normal mode frequencies are not equal. The normal mode frequencies may be made equal and the drift sensitivity to residual quadrature vibration reduced to zero by applying additional negative electrical spring components as a function of pattern angle as indicated by the first two terms of equations (4) and (5).

In practice, the required electrical spring component is determined in a calibration run by inserting a known amount of quadrature vibration and measuring the additional drift that results as a function of vibration pattern location. In this way, the electrical spring component required to match the normal mode frequencies is determined, including both the linear and the nonlinear influences. When this electrical spring component is included, the drift sensitivity to quadrature motion is reduced to near zero. This desensitization to quadrature error greatly reduces what would otherwise be the principal cause of drift variability.

The embodiments of the invention in which an exclusive property or privilege is claimed are defined as follows:

1. A vibratory rotation sensor comprising a resonator capable of sustaining a flexural standing wave pattern symmetrically distributed about an input axis, means supporting said resonator along said input axis, means for maintaining the amplitude of said pattern in said resonator, pick-off means responsive to resonator motion for producing first and second pick-off signals proportional to two components of pattern flexure, means for generating timing signals, means responsive to the said first and second pick-off signals and said timing signals for producing a signal proportional to a readout angle $\Theta$, means responsive to said first and second pick-off signals and said timing signals for obtaining the quadrature component (cos quad) of said first pick-off signal relative to said timing signals and the quadrature component (sin quad) of said second pick-off signals relative to said timing signals, means responsive to said quadrature components and said readout angle $\Theta$ for obtaining an antinodal quadrature signal equal to ((cos quad)cos $2\Theta$+(sin quad)sin $2\Theta$), a phase locked loop responsive to said antinodal quadrature signal for regulating said timing signals by driving said antinodal quadrature signal to zero to thereby keep the phase of the timing signals locked to the phase of the antinodal component of the standing wave pattern.

2. A vibratory rotation sensor comprising a resonator capable of sustaining a flexural standing wave pattern symmetrically distributed about an input axis, means supporting said resonator along said input axis, forcer means for initiating said pattern in said resonator and including a plurality of discrete forcer electrodes defining first and second axis sets displaced one from the other by a predetermined number of degrees, pick-off means responsive to resonator motion for producing first ($E_c$) and second ($E_s$) pick-off signals proportional to two components of pattern flexure, means for generating timing signals, pattern angle readout means responsive to the said first and second pick-off signals and said timing signals for producing a readout angle $\Theta$, quadrature detector means responsive to said first and second pick-off signals and said timing signals for obtaining the quadrature component (cos quad) of said first pick-off signal relative to said timing signals and the quadrature component (sin quad) of said second pick-off signals relative to said timing signals, coordinate transformation means responsive to said quadrature components and said readout angle $\Theta$ for obtaining an antinodal quadrature signal equal to ((cos quad)cos $2\Theta$+(sin quad)sin $2\Theta$) and a nodal quadrature signal equal to ((cos quad)sin$2\Theta$−(sin quad)cos $2\Theta$), phase locked loop means responsive to said antinodal quadrature signal for regulating said timing signals by driving said antinodal quadrature signal to zero to thereby keep the phase of the timing signals locked to the phase of the antinodal component of the standing wave pattern, means responsive to said nodal quadrature signal for generating a nodal quadrature error signal, and means for distributing said error signal along said first and second axis sets to drive said nodal quadrature signal to zero and thereby keep the components of the pattern in phase.

3. A vibratory rotation sensor comprising a resonator capable of sustaining a flexural standing wave pattern symmetrically distributed about an input axis, means supporting said resonator along said input axis, forcer means for initiating said pattern in said resonator and including a plurality of discrete forcer electrodes defining first and second axis sets displaced one from the other by a predetermined number degrees, pick-off means responsive to resonator motion for producing first($E_c$) and second($E_s$) pick-off signals proportional to two components of pattern flexure, means for generating timing signals, pattern angle readout means responsive to the said first and second pick-off signals and said timing signals for producing a readout angle $\Theta$, quadrature detector means responsive to said first and second pick-off signals and said timing signals for obtaining the quadrature component(cos quad) of said first pick-off signal relative to said timing signals and the quadrature component(sin quad) of said second pick-off signals relative to said timing signals, coordinate transformation means responsive to said quadrature components and said readout angle $\Theta$ for obtaining an antinodal quadrature signal equal to ((cos quad)cos $2\Theta$+(sin quad)sin $2\Theta$) and a nodal quadrature signal equal to ((cos quad)sin$2\Theta$−(sin quad)cos $2\Theta$), phase locked loop means responsive to said antinodal quadrature signal for regulating said timing signals by driving said antinodal quadrature signal to zero to thereby keep the phase of the timing signals locked to the phase of the antinodal component of the standing wave pattern, means responsive to said nodal quadrature signal for generating a nodal quadrature error signal, means providing a calibration error signal, and means for distributing said nodal quadrature error signal and said calibration error signal along said first and second axis sets to drive said nodal quadrature signal to zero and thereby keep the components of the pattern in phase.

4. A vibratory rotation sensor comprising a resonator capable of sustaining a flexural standing wave pattern symmetrically distributed about an input axis, means supporting said resonator along said input axis, forcer means including a circular forcer electrode and first, second, third and fourth sets of discrete orthogonal forcer electrodes, means including said discrete forcer electrodes for initiating said pattern in said resonator means including said circular electrode controlling the amplitude of flexure of said pattern, said first and second sets of discrete forcer electrodes displaced one from the other by 45 degrees and defining first and second axis sets, said third and fourth sets of discrete forcer electrodes displaced one from the other by 45 degrees and defining third and fourth axis sets interposed between said first and second axis sets, pick-off means responsive to resonator motion along said first and second axis sets and including first and second sets of discrete orthogonal pick-off electrodes, said pick-off means producing first and second pick-off signals ($E_c,E_s$) that represent the vibration pattern components along said first and second axis sets, reference generator means for generating timing signals, angle readout means responsive to the said first and second pick-off signals and said timing signals for producing a signal proportional to a readout angle $\Theta$, means responsive to said first and second pick-off signals and said timing signal for obtaining the quadrature component(cos quad) of said first pick-off signal relative to said timing signals and the quadrature component(sin quad) of said second pick-off signals relative to said timing signals, means responsive to said quadrature components and said readout angle $\Theta$ for obtaining an antinodal quadrature signal equal to ((cos quad)cos $2\Theta$+(sin quad)sin $2\Theta$), phase locked loop means responsive to said antinodal quadrature signal for regulating said timing signals by driving said antinodal quadrature signal to zero to thereby keep the phase of the timing signals locked to the phase of the antinodal component of the standing wave pattern, means responsive to said nodal quadrature signal for generating a nodal quadrature error signal, means providing a calibration error signal, and means for distributing said nodal quadrature error signal and said calibration error signal along said first or second axis sets and said third or fourth axis sets to drive said nodal quadrature signal to zero and thereby keep the components of the pattern in phase.

5. A vibratory rotation sensor comprising a resonator capable of sustaining a flexural standing wave pattern symmetrically distributed about an input axis,
   pick-off means responsive to resonator motion for producing first and second pick-off signals proportional to two components of pattern flexure,
   means for generating timing signals,
   means responsive to the said first and second pick-off signals and said timing signals for producing a signal proportional to a pattern precession angle $\Theta$,
   quadrature detector means responsive to said first and second pick-off signals and said angle $\Theta$ for obtaining an antinodal quadrature signal,
   a phase locked loop responsive to said antinodal quadrature signal for locking the phase of the timing signals locked to the phase of the antinodal component of the standing wave pattern.

6. A vibratory rotation sensor comprising a resonator capable of sustaining a flexural standing wave pattern symmetrically distributed about an input axis,
   means supporting said resonator along said input axis,
   means for generating timing signals,
   pick-off means responsive to resonator motion for producing first and second pick-off signals proportional to two components of pattern flexure,
   first forcer means responsive to said first and second pickoff signals and said timing signals for controlling the amplitude of resonator flexure,
   pattern angle detecting means responsive to the said first and second pick-off signals and said timing signals for providing a signal proportional to any vibration pattern rotation angle $\Theta$ with respect to a reference location,
   detector means responsive to said first and second pick-off signals and said timing signals for obtaining the quadrature component(cos quad) of said first pick-off signal relative to said timing signals and the quadrature component(sin quad) of said second pick-off signals relative to said timing signals,
   means performing a coordinate transformation of said quadrature components to obtain an antinodal quadrature signal equal to ((cos quad)cos $2\Theta$+(sin quad)sin 2Θ) and a nodal quadrature signal equal to ((cos quad) sin 2Θ−(sin quad)cos 2Θ), phase locked loop means responsive to said antinodal quadrature signal for keeping the phase of the timing signals locked to the phase of the antinodal component of the standing wave pattern, second forcer means comprising first, second, third and fourth sets of forcer electrodes separated by 22.5 degrees, each set of forcer electrodes comprising four discrete electrodes, resonator quadrature control means responsive to said nodal quadrature signal for applying voltages to said first or second and said third or fourth sets of forcer electrodes to maintain said components of pattern flexure in phase and minimize the drift sensitivity to quadrature motion.

7. A vibratory rotation sensor comprising a resonator, means supporting said resonator along an input axis, forcer means for initiating a flexural standing wave pattern in said resonator and for maintaining a substantially constant amplitude of resonator flexure, pick-off means responsive to resonator motion for producing first and second pick-off signals proportional to two components of pattern flexure, means for detecting the quadrature components of said first and second pick-off signals and for generating a nodal quadrature signal, said forcer means comprising a circular electrode and a plurality of sets of discrete forcer electrodes separated by a predetermined number of degrees, resonator quadrature control loop means responsive to said nodal quadrature signal for applying voltages to selected sets of said discrete forcer electrodes to maintain said components of pattern flexure in phase.

8. A vibratory rotation sensor comprising a resonator capable of sustaining a flexural standing wave pattern symmetrically distributed about an input axis, resonator pick-off means responsive to resonator flexing motion for producing first and second pick-off signals proportional to two components of pattern flexure, detector means for detecting the quadrature components of said first and second pick-off signals and for generating a nodal quadrature signal resonator quadrature control means responsive to said nodal quadrature signal for applying forces to said resonator to maintain said components of pattern flexure in phase.

9. A vibratory rotation sensor comprising a resonator capable of sustaining a flexural standing wave pattern symmetrically distributed about an input axis, resonator amplitude control means for maintaining a substantially constant amplitude of resonator flexure, resonator pick-off means responsive to resonator flexing motion for producing first and second pick-off signals proportional to two components of pattern flexure, detector means for detecting the quadrature components of said first and second pick-off signals and for generating a nodal quadrature error signal, resonator quadrature control means for applying forces to said resonator to reduce said nodal quadrature error signal to thereby reduce any phase difference between said components of pattern flexure.

10. A vibratory rotation sensor comprising a resonator capable of sustaining a flexural standing wave pattern symmetrically distributed about an input axis, resonator pick-off means responsive to resonator flexing motion for producing first and second pick-off signals proportional to two components of pattern flexure, resonator amplitude control means responsive to said first and second pick-off signals for maintaining a substantially constant amplitude of resonator flexure, pattern angle detecting means responsive to said first and second pick-off signal for detecting the angular location of said pattern with respect to a reference location, detector means for detecting the quadrature components of said first and second pick-off signals and for generating a nodal quadrature error signal, means for storing calibration coefficients for use in reducing the drift sensitivity of the sensor to quadrature components of flexural motion, resonator quadrature control means for applying forces to said resonator as a function of said calibration coefficients and the amount of nodal quadrature error signal to thereby substantially eliminate any phase or frequency difference between said components of pattern flexure.

11. A vibratory rotation sensor comprising a resonator capable of sustaining a flexural standing wave pattern having antinodal and nodal axis sets symmetrically distributed about an input axis, means supporting said resonator along said input axis, means for maintaining the amplitude of said pattern in said resonator, pick-off means responsive to resonator motion along first and second pick-off axes for detecting first and second pick-off signals proportional to two components of pattern flexure along said first and second axis sets respectively, means for generating timing signals, means responsive to the said first and second pick-off signals and said timing signals for producing a signal proportional to a readout angle Θ between said first pickoff axis and the antinodal axis, means responsive to said first and second pick-off signals and said timing signals for obtaining the quadrature component(cos quad) of said first pick-off signal relative to said timing signals and the quadrature component(sin quad) of said second pick-off signals relative to said timing signals, means responsive to said quadrature components and said readout angle Θ for developing an antinodal quadrature signal equal to ((cos quad)cos 2Θ+(sin quad) sin 2Θ), a phase locked loop responsive to said antinodal quadrature signal for regulating said timing signals by driving said antinodal quadrature signal to zero.

* * * * *